United States Patent
Lin et al.

(10) Patent No.: US 9,682,479 B2
(45) Date of Patent: Jun. 20, 2017

(54) DRIVING COMPONENT, ROBOT AND ROBOT SYSTEM

(71) Applicant: HON HAI PRECISION INDUSTRY CO., LTD., New Taipei (TW)

(72) Inventors: Yi-Cheng Lin, New Taipei (TW); Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 48 days.

(21) Appl. No.: 14/836,304

(22) Filed: Aug. 26, 2015

(65) Prior Publication Data

US 2016/0346925 A1  Dec. 1, 2016

(30) Foreign Application Priority Data

May 27, 2015 (CN) .......................... 2015 1 0276866

(51) Int. Cl.
*B25J 9/18* (2006.01)
*G05B 19/19* (2006.01)
*B25J 9/16* (2006.01)
*B25J 9/08* (2006.01)

(52) U.S. Cl.
CPC .............. *B25J 9/1676* (2013.01); *B25J 9/08* (2013.01)

(58) Field of Classification Search
CPC ... B25J 5/007; B25J 9/08; B25J 9/0003; B25J 9/1664; B25J 11/0005; B25J 13/06; B25J 13/08; B25J 19/023; B25J 5/00; B25J 9/161; B25J 9/1651; B25J 9/1671; B25J 9/1679; B25J 9/1689; B25J 9/1694

USPC .......... 318/568.11, 568.24; 700/245; 446/85, 446/90

See application file for complete search history.

(56) References Cited

U.S. PATENT DOCUMENTS

| | | | | |
|---|---|---|---|---|
| 6,374,155 | B1 * | 4/2002 | Wallach | G05D 1/0274 700/245 |
| 6,411,055 | B1 * | 6/2002 | Fujita | B25J 9/1679 318/568.11 |
| 6,496,755 | B2 * | 12/2002 | Wallach | G05D 1/0274 318/568.11 |
| 6,605,914 | B2 * | 8/2003 | Yim | A63H 33/042 318/568.11 |
| 6,636,781 | B1 * | 10/2003 | Shen | B08B 9/045 318/568.11 |
| 6,725,128 | B2 * | 4/2004 | Hogg | G06N 3/008 318/560 |
| 7,013,750 | B1 * | 3/2006 | Kazami | B25J 9/08 74/490.03 |
| 7,117,067 | B2 * | 10/2006 | McLurkin | G06N 3/008 294/86.4 |

(Continued)

*Primary Examiner* — Paul Ip
(74) *Attorney, Agent, or Firm* — Steven Reiss (57) ABSTRACT

A driving component for robot can include a communicating module configured to receive control signals, a motor, a controller coupled to the communicating module and configured to drive the motor according to the control signals received by the communicating module, a sensor configured to detect environment and providing detected results to the controller, a battery configured to provide electric power to the communicating module, the motor, the controller and the sensor, and a housing containing the communicating module, the motor, the controller, the sensor and the battery. The housing can include a coupling structure configured to couple to another driving component.

5 Claims, 7 Drawing Sheets

(56) References Cited

U.S. PATENT DOCUMENTS

| | | | |
|---|---|---|---|
| 7,206,666 B2* | 4/2007 | Ito | B25J 9/06 318/568.24 |
| 2002/0095239 A1* | 7/2002 | Wallach | G05D 1/0274 700/245 |
| 2002/0152006 A1* | 10/2002 | Bennett, III | B82Y 10/00 700/245 |
| 2003/0038607 A1* | 2/2003 | Yim | B25J 9/08 318/568.11 |
| 2003/0109958 A1* | 6/2003 | Hogg | G06N 3/008 700/245 |
| 2004/0024490 A1* | 2/2004 | McLurkin | G06N 3/008 700/245 |
| 2004/0103738 A1* | 6/2004 | Gao | B25J 7/00 74/490.01 |
| 2004/0193318 A1* | 9/2004 | Ito | B25J 9/06 700/245 |
| 2005/0234592 A1* | 10/2005 | McGee | G05D 1/0272 700/245 |
| 2009/0122502 A1* | 5/2009 | Baran | H05K 7/1485 361/807 |
| 2010/0016114 A1* | 1/2010 | Chang | B25J 9/08 475/149 |
| 2011/0048433 A1* | 3/2011 | Pfister | A61B 17/12022 128/898 |
| 2012/0122059 A1* | 5/2012 | Schweikardt | A63H 33/04 434/118 |
| 2012/0191244 A1* | 7/2012 | Kim | B25J 9/1602 700/245 |
| 2012/0259461 A1* | 10/2012 | Yang | B25J 15/0206 700/245 |
| 2013/0109267 A1* | 5/2013 | Schweikardt | A63H 33/04 446/85 |
| 2013/0183882 A1* | 7/2013 | Oschuetz | A63H 33/042 446/90 |
| 2013/0217295 A1* | 8/2013 | Karunaratne | A63H 33/042 446/124 |
| 2013/0346920 A1* | 12/2013 | Morris | G06F 3/0482 715/835 |
| 2014/0222198 A1* | 8/2014 | Emami | B25J 9/08 700/250 |
| 2015/0041227 A1* | 2/2015 | Jun | B62D 57/032 180/8.6 |
| 2015/0240848 A1* | 8/2015 | Jang | A63H 13/00 403/336 |
| 2015/0251104 A1* | 9/2015 | Lange | A63H 33/046 446/92 |
| 2015/0321348 A1* | 11/2015 | Rollinson | B25J 9/065 700/253 |
| 2016/0005331 A1* | 1/2016 | Ryland | B25J 9/08 434/118 |
| 2016/0184993 A1* | 6/2016 | Brandwijk | A63H 33/04 700/258 |
| 2016/0346920 A1* | 12/2016 | Yan | B25J 9/161 |

* cited by examiner

DRIVING COMPONENT, ROBOT AND ROBOT SYSTEM

FIELD

The subject matter herein generally relates to robot technology, and particularly to a driving component, a robot using the driving component and a robot system.

BACKGROUND

Robot is a kind of multi-functional automatic or semi-automatic machinery. The robot can carry out production activities through program controls, or provide the human life, health, safety, entertainment or other aspects of services, in combination with the application of artificial intelligence and sensor technology.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a driving component for robot. The driving component for robot can include a communicating module configured to receive control signals, a motor, a controller coupled to the communicating module and configured to control the motor to drive according to the control signals received by the communicating module, a sensor configured to detect environment characteristics and providing detected results to the controller, a battery configured to provide electric power to the communicating module, the motor, the controller and the sensor, and a housing containing the communicating module, the motor, the controller, the sensor and the battery. The housing can include a coupling structure configured to couple to another driving component.

The present disclosure is described further in relation to a robot. The robot can include a plurality of driving components coupled together. Each of the plurality of driving components can include a communicating module configured to receive control signals, a motor, a controller coupled to the communicating module and configured to drive the motor according to the control signals received by the communicating module. Additionally, a sensor can be configured to detect environment and provide detected results to the controller, and a battery can be configured to provide electric power to the communicating module, the motor, the controller and the sensor. Furthermore, each of a housing containing the communicating module, the motor, the controller, the sensor and the battery, and a driving rod extending through the housing. The driving rod of the driving component is coupled to a coupling structure to make the driving components coupled together.

The present disclosure is described further in relation to a robot system. The robot system can include a plurality of driving components coupled together, and a control device configured to control each of the driving components. Each of the plurality of driving components can include a communicating module configured to receive control signals from the control device, a motor, a controller coupled to the communicating module and configured to control the motor to drive according to the control signals received by the communicating module, a sensor configured to detect environment and provide detected results to the controller, a battery configured to provide electric power to the communicating module, the motor, the controller and the sensor, a housing containing the communicating module, the motor, the controller, the sensor and the battery, and a driving rod extending through the housing. The driving rod of the driving component is coupled to a coupling structure to make the driving components coupled together.

Figure 1:
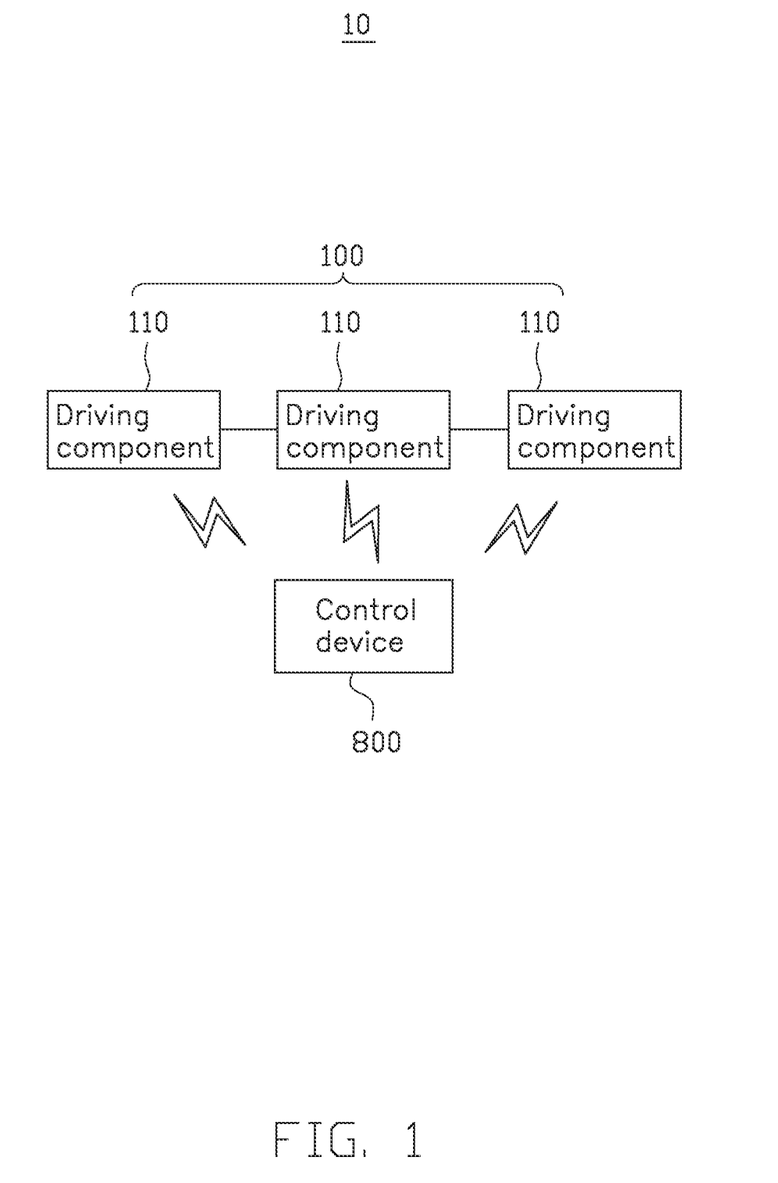
FIG. 1 is a diagrammatic view of a robot system in accordance with an embodiment of the present disclosure.

FIG. 1 illustrates a robot system 10 including a robot 100 and control device 800 configured to control the robot 100. The robot 100 can include a plurality of driving components 110 be individually controlled by the control device 800. The driving components 110 are connected together and can be controlled linkage. The control device 800 can be a remote control, a smart phone, a smart tablet, a smart wearable device or other remote control devices.

Figure 2:
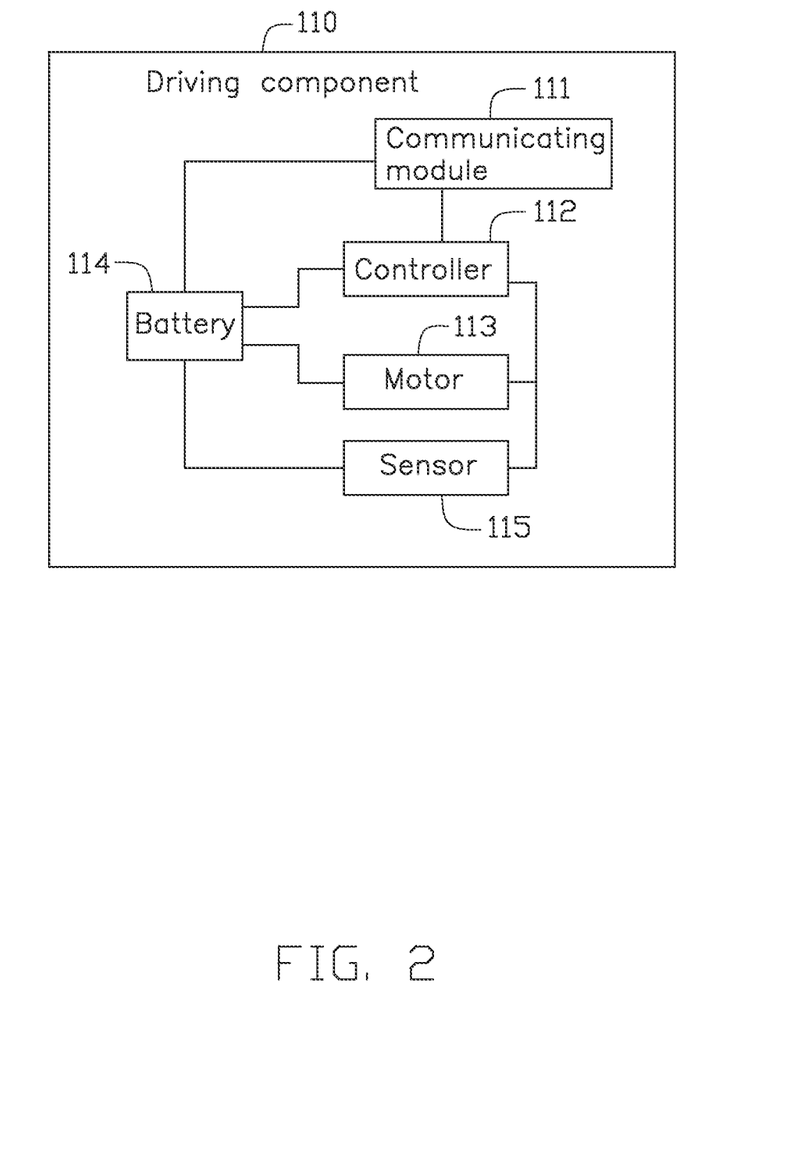
FIG. 2 is a diagrammatic view of a driving component of the robot system in FIG. 1.

FIG. 2 illustrates that each of the driving components 110 can include a communicating module 111, a controller 112, a motor 113, a battery 114 and a sensor 115.

The communicating module 111 is coupled to and configured to receive control signals from the control device 800. The communicating module 111 can include one or more kinds of wireless communicating devices. The wireless communicating device can be a radio frequency device, a WiFi device, BLUETOOTH device, Zigbee device, a 3G device or a 4G device used to be connected to internet.

The controller 112 is coupled to the communicating module 111 and is configured to control the motor 113 to drive according to the control signals received by the communicating module 111. The controller 112 can include a processor, a microcontroller, a digital signal processor or an ARM processor. Each of the processor, microcontroller, digital signal processor or ARM processor can support an open source solution such as the ARDUINO platform. The control the motor 113 is coupled to the communicating module 111.

The battery 114 is configured to provide electric power to the communicating module 111, the motor 113, the controller 112 and the sensor 115. The battery 114 can be a lithium-ion battery such as a liquified lithium-ion battery. The battery 114 can be managed by the controller 112.

The sensor 115 is configured to detect environment and provides detected results to the controller 112. The controller 112 controls the motor 113 to make new drive action according to the detected results and provides the new drive action to the control device 800. The sensor 115 can include a pressure sensor and a distance sensor. The distance sensor can include an ultrasonic range finder and/or an infrared range finder.

Figure 3:
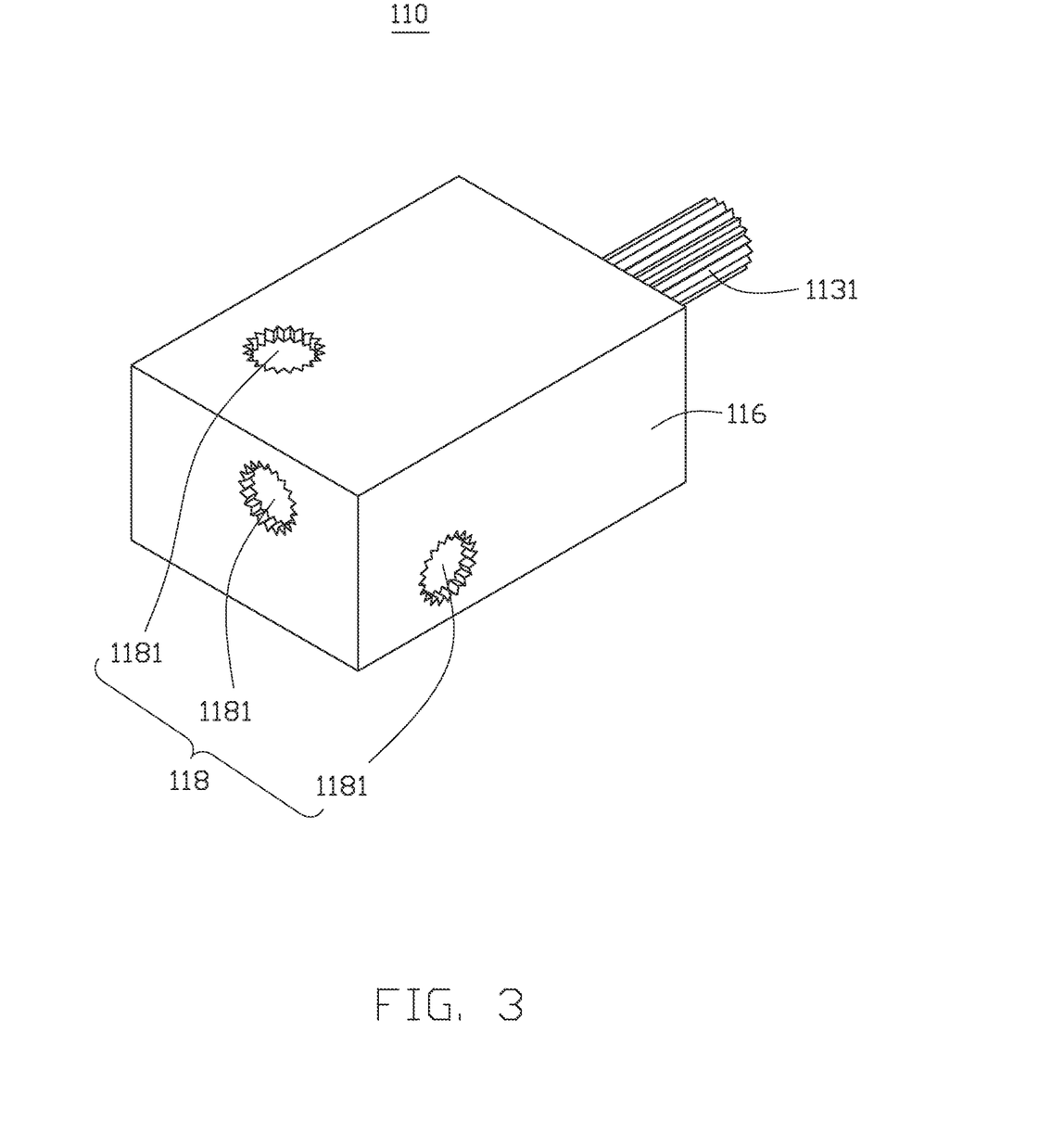
FIG. 3 is an isometric view of the driving component in FIG. 2.

FIG. 3 illustrates that the driving component 110 further includes a housing 116 and a driving rod 1131 extending through the housing 116. The driving rod 1131 extends a plurality of teeth from a circumferential face thereof. The driving rod 1131 has a cross section in a profile of gear. The housing 116 forms a plurality of coupling structures 118 configured to couple to the driving rod 1131 of another driving component 110. The coupling structure 118 can include one or more coupling holes 1181. The housing 116 can be in a shape of hexahedron. When the coupling structure 118 includes more coupling holes 1181, the coupling holes 1181 are defined in different faces of the housing 116. Every two of the coupling holes 1181 have different orientations, which increases selectivity when the plurality of driving components 110 are coupled to each other. Each coupling hole 181 has a profile of gear which matches to the driving rod 1131.

In at least one alternative embodiment, the coupling hole 1181 and the driving rod 1131 can have profiles in other shapes, such as rectangular or ellipse.

Figure 4:
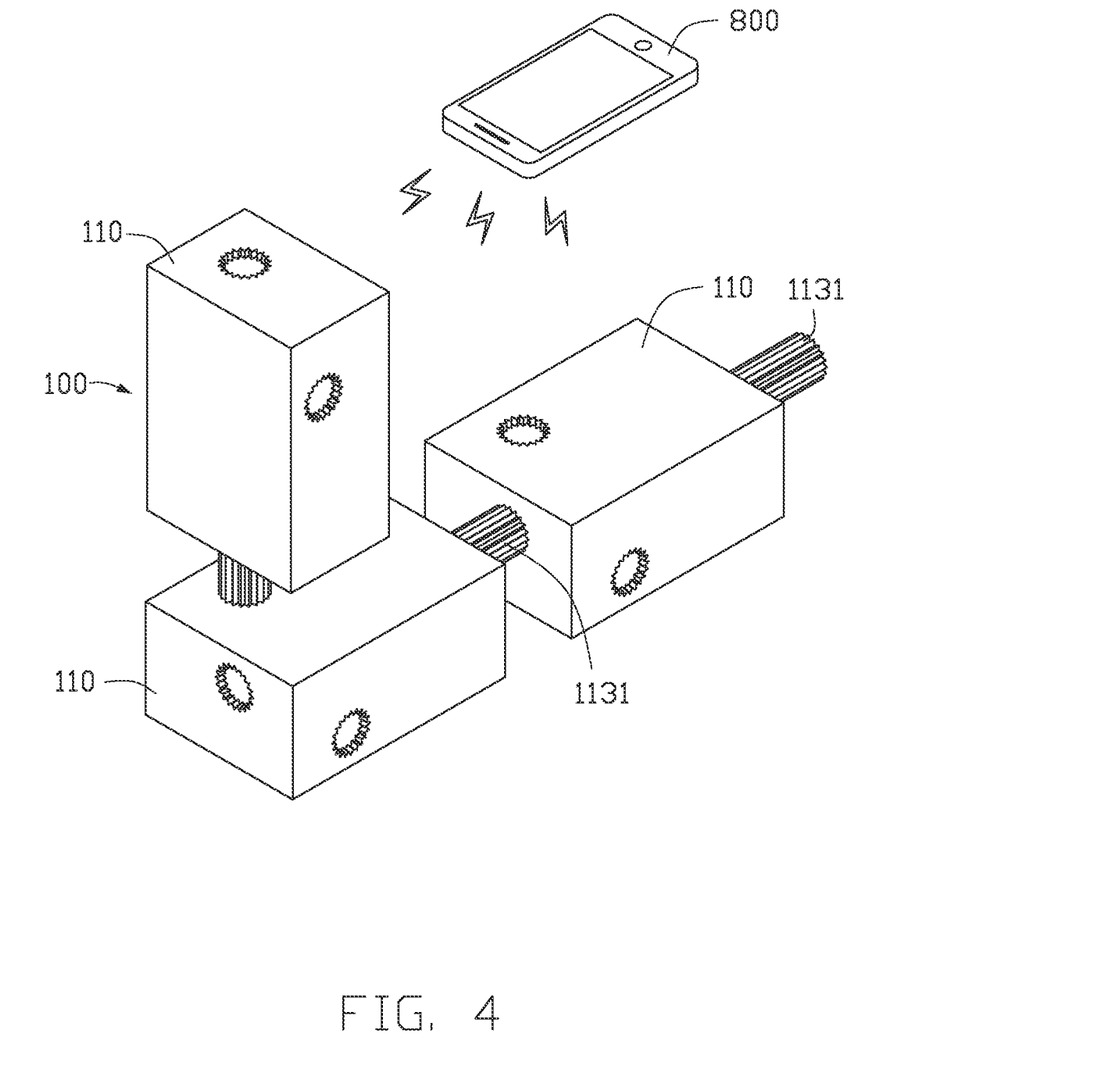
FIG. 4 is an isometric view of the robot system in FIG. 1 with a robot of a first embodiment in a working state.

FIG. 4 illustrates that a robot 100 of a first embodiment can include three driving components 110. The three driving components 110 include a first driving component 110, a second driving component 110 coupled to the first driving component 110, and a third driving component 110 coupled to the second driving component 110. The second driving component 110 is coupled to the first driving component 110 via the driving rod 1131 of the second driving component 110 coupled to the coupling hole 1181 of the coupling structure 118 of first driving component 110. The third driving component 110 is coupled to the second driving component 110 via the driving rod 1131 of the third driving component 110 coupled to the coupling hole 1181 of the coupling structure 118 of second driving component 110. The three driving components 110 can be centrally controlled by the control device 800. The three driving components 110 produce actions of linkage to realize move, grab or other actions and functions of the robot 100.

Figure 5:
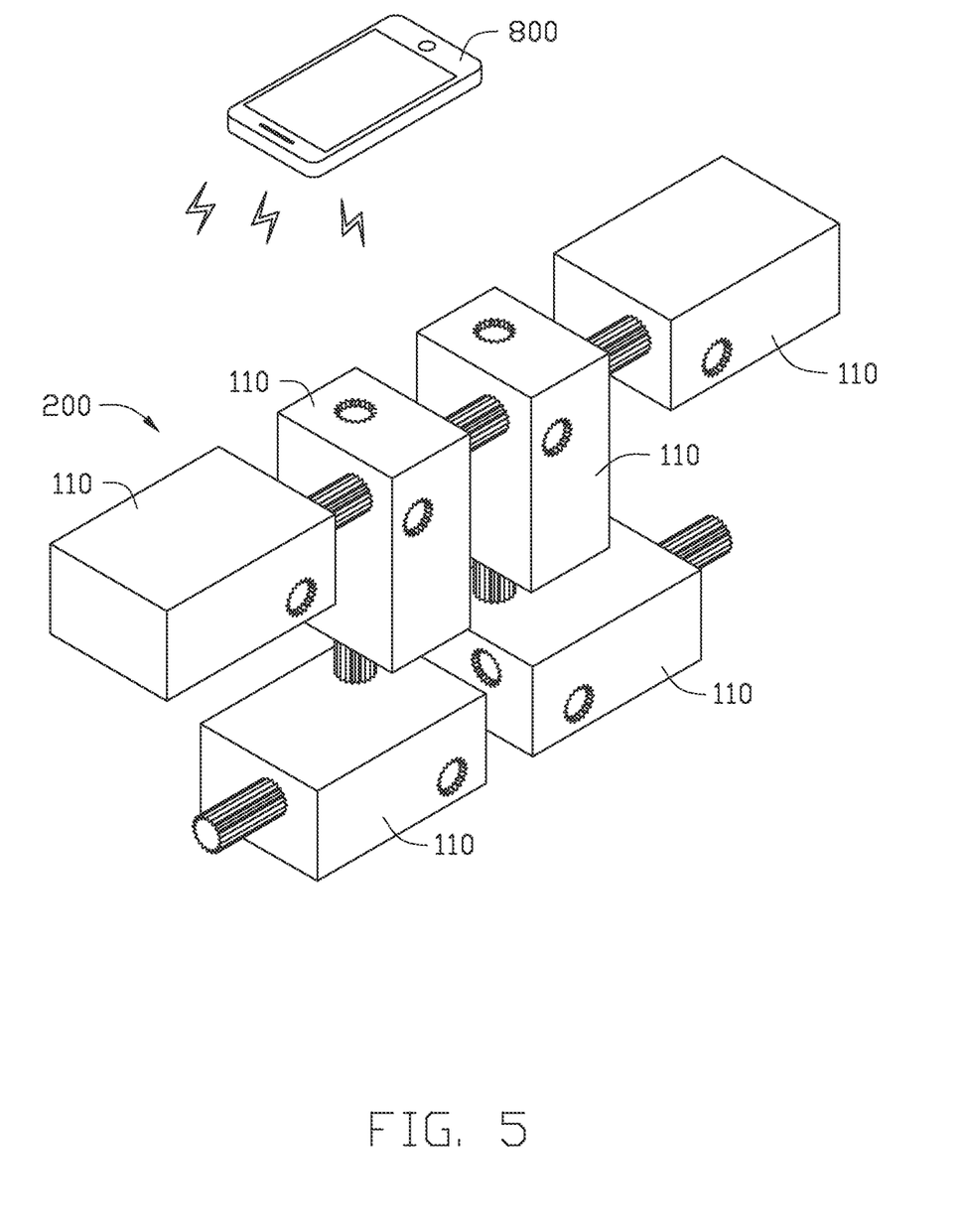
FIG. 5 is an isometric view of the robot system in FIG. 1 with a robot of a second embodiment in a working state.

FIG. 5 illustrates that a robot 200 of a second embodiment can include six driving components 110. The six driving components 110 can include two first driving components 110 arranged side by side, two second driving components 110 located on and coupled to the two first driving components 110 respectively, and two third driving components 110 located at and coupled to two opposite sides of the two second driving components 110. The second driving component 110 is coupled to the first driving component 110 via the driving rod 1131 of the second driving component 110 coupled to the coupling hole 1181 of the coupling structure 118 of first driving component 110. The third driving component 110 is coupled to the second driving component 110 via the driving rod 1131 of the third driving component 110 coupled to the coupling hole 1181 of the coupling structure 118 of second driving component 110. The two second driving components 110 are coupled together via another driving rod 1131 coupled to other coupling holes 1181 of the coupling structures 118 of second driving components 110. The six driving components 110 can be centrally controlled by the control device 800. The six driving components 110 produce actions of linkage to realize move, grab or other actions and functions of the robot 200.

Figure 6:
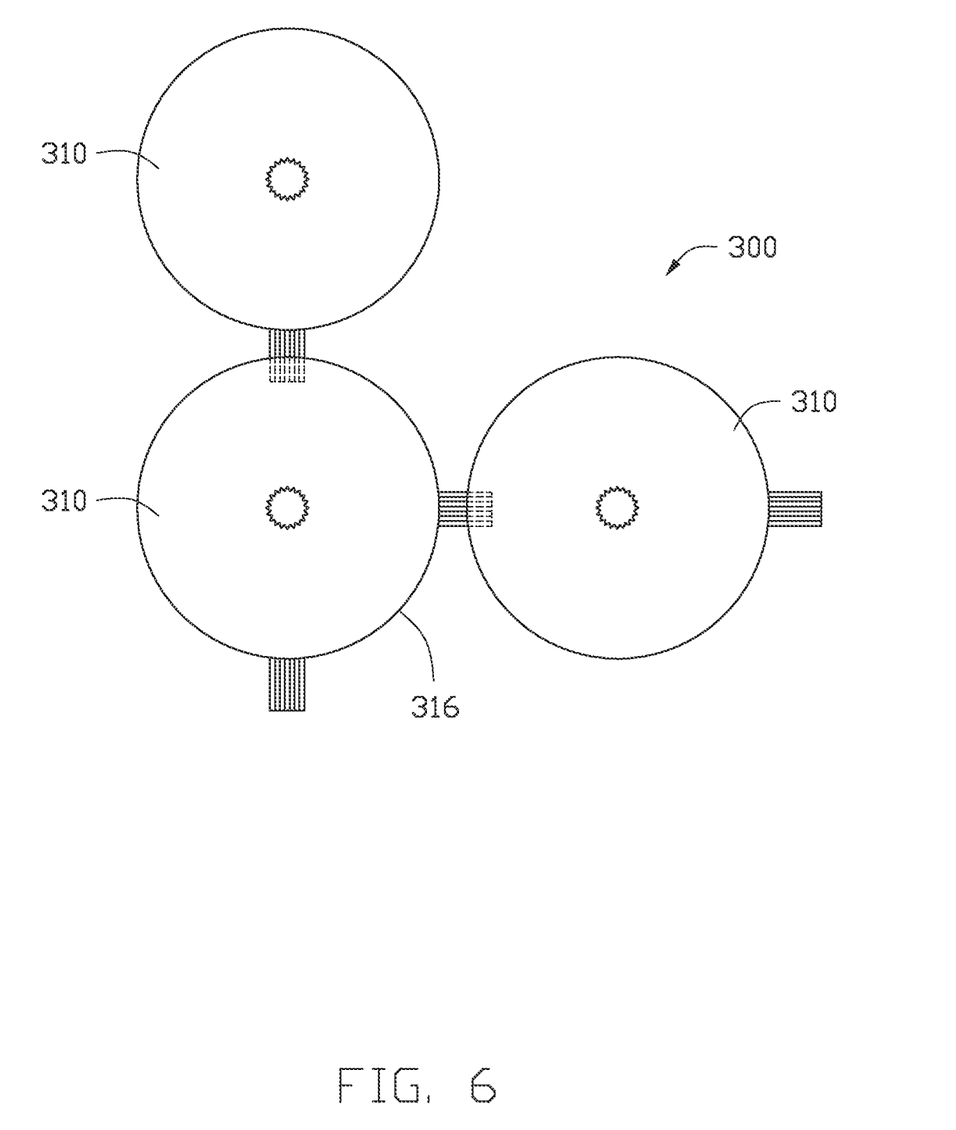
FIG. 6 is a diagrammatic view of a robot of a third embodiment.

FIG. 6 illustrates that in at least one embodiment, a robot 300 of a third embodiment can include a plurality of driving components 310 coupled together. Each of the driving components 310 has a housing 316 in a spherical or elliptical shape.

Figure 7:
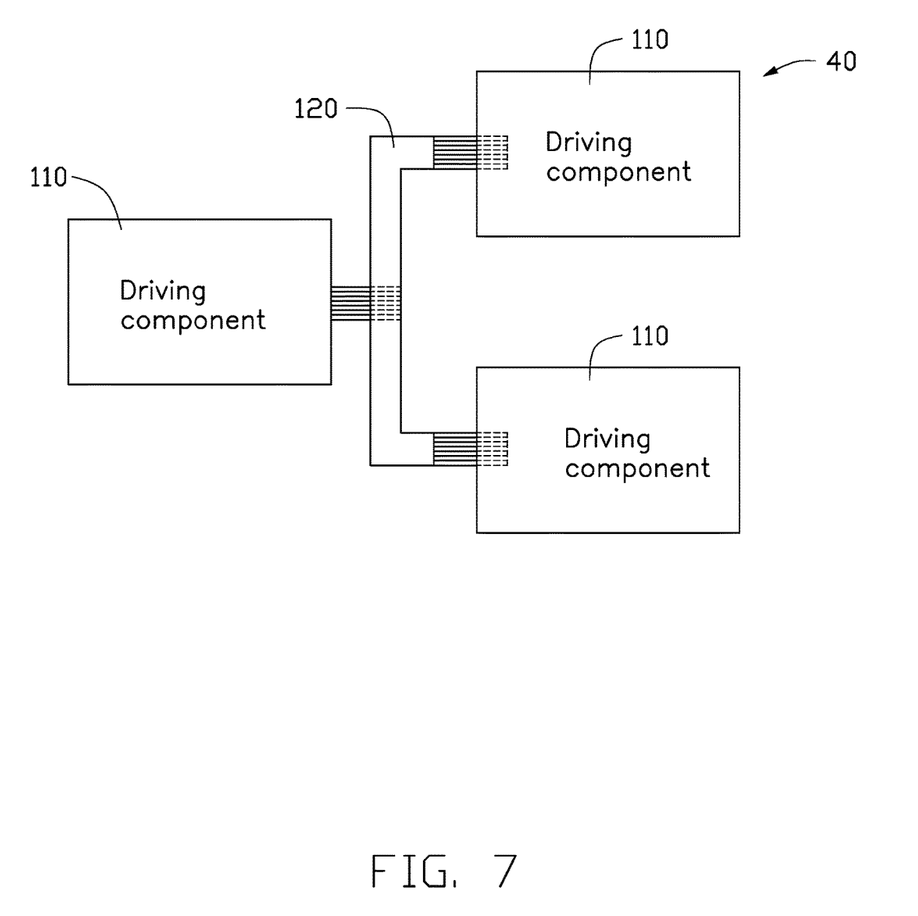
FIG. 7 is a diagrammatic view of a robot of a fourth embodiment.

FIG. 7 illustrates that in at least one embodiment, a fourth robot 400 of a fourth embodiment can include a plurality of driving components 110 and a coupling rod 120 coupled to the driving components 110. The coupling rod 120 can replace the coupling structure 118 of the driving components 110. The driving rods 1131 of the driving components 110 are coupled to the coupling rod 120. The coupling rod 120 can be L-shaped or C-shaped.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of Shape, size and arrangement of the parts within the principles of the present disclosure up to, and including, the full extent established by the broad general meaning of the terms used in the claims.

What is claimed is:

1. A robot comprising:
a plurality of driving components coupled together, each of the plurality of driving components comprising:
   a communicating module configured to receive control signals;
   a motor;
   a controller coupled to the communicating module and configured to control the motor to drive according to the control signals received by the communicating module;
   a sensor configured to detect environment characteristics and provide detected results to the controller;
   a battery configured to provide electric power to the communicating module, the motor, the controller and the sensor;
   a housing comprising a plurality of surfaces, the housing containing the communicating module, the motor, the controller, the sensor and the battery therein; and
   at least one driving rod, each at least one driving rod extending through one of the plurality of surfaces of the housing; and
   a coupling rod having at least two ends, the driving rod of one driving component being coupled to a middle portion of the coupling rod, and each of the at least two ends of the coupling rod being coupled to a corresponding driving rod of another driving component, thereby coupling at least two driving components to one surface of one driving component.

2. A robot system comprising:
a plurality of driving components coupled together, and a control device configured to control each of the driving components, each of the plurality of driving components comprising:
   a communicating module configured to receive control signals from the control device;
   a motor;
   a controller coupled to the communicating module and configured to control the motor to drive according to the control signals received by the communicating module;
   a sensor configured to detect environment characteristics and provide detected results to the controller;
   a battery configured to provide electric power to the communicating module, the motor, the controller and the sensor;
   a housing comprising a plurality of surfaces, the housing containing the communicating module, the motor, the controller, the sensor and the battery therein; and
   at least one driving rod, each at least one driving rod extending through one of the plurality of surfaces of the housing; and
   a coupling rod having at least two ends, the driving rod of one driving component being coupled to a middle portion of the coupling rod, and each of the at least two ends of the coupling rod being coupled to a corresponding driving rod of another driving component, thereby coupling at least two driving components to one surface of one driving component.

3. The robot system of claim 2, wherein the control device is a remote control, a smart phone, a smart tablet, a smart wearable device or other remote control devices.

4. The robot system of claim 2, wherein the communicating module comprises one or more kinds of wireless communicating devices coupled to the control device.

5. The robot system of claim 4, wherein the communicating module is a radio frequency device, a WiFi device, bluetooth device, Zigbee device, a 3G device or a 4G device used to be connected to internet.

* * * * *